United States Patent [19]
Edwards

[11] 3,889,994
[45] June 17, 1975

[54] REBOUND CONTROL FOR ENERGY ABSORBER UNIT

[75] Inventor: Ralph W. Edwards, Kettering, Ohio

[73] Assignee: General Motors Corporation, Detroit, Mich.

[22] Filed: Aug. 23, 1973

[21] Appl. No.: 390,751

[52] U.S. Cl.................. 293/85; 267/9 C; 188/271
[51] Int. Cl............................................ B60r 19/06
[58] Field of Search............. 267/9 C; 188/271, 322; 213/22, 32 R; 293/70, 85, 86, 89

[56] References Cited
UNITED STATES PATENTS
| | | | |
|---|---|---|---|
| 2,994,442 | 8/1961 | Frederick | 188/271 |
| 3,054,478 | 9/1962 | Rumsey | 267/9 C |
| 3,722,640 | 3/1973 | Taylor | 188/322 |

*Primary Examiner*—Evon C. Blunk
*Assistant Examiner*—Robert Saifer
*Attorney, Agent, or Firm*—Charles R. White

[57] ABSTRACT

A thermoplastic rebound control and fluid sealing sleeve having a high degree of resilience is disposed between telescopically mounted outer and inner cylinders of an energy absorbing unit. When deflected the sleeve provides a mechanical drag load between the cylinders as the inner cylinder telescopically moves within the outer cylinder. The added friction of the drag load effectively reduces return speed of the cylinders from a telescoped retracted position to a normal extended position to eliminate or substantially reduce damage that may otherwise occur from absorber unit rebound.

4 Claims, 4 Drawing Figures

PATENTED JUN 17 1975  3,889,994

REBOUND CONTROL FOR ENERGY ABSORBER UNIT

This invention relates to energy absorber units having telescopically mounted inner and outer cylinders and more particularly to a new and improved elastic sleeve assembly stressed in response to relative movement of the cylinders from an extended position to provide a mechanical drag load between the cylinders for controlling rebound energy of the unit.

Hydraulic and pneumatic energy absorber units mounting a bumper to a vehicle frame have been effectively employed to dissipate low speed impact energy. When the impact force is removed, compressed gas within the unit exerts a force on the unit cylinders to automatically return the unit to its original extended position. In some designs the rate of return of the energy absorbing unit to its original position and the shape of the object impacted causes the bumper of the vehicle to ramp up on the face of a bumper of an impacted vehicle or other object after the initial impact causing damage to components of an impacted vehicle.

With this invention the rate of return of the energy absorbing unit to its extended position is reduced to a point where there is no damage to other vehicles after initial impact resulting from the return of the energy absorber unit to its original position.

In this invention a new and improved rebound control assembly for energy absorbing units is provided which requires only slight changes in existing energy absorbing unit structure. In the preferred embodiment there is a new and improved rebound control sleeve made of a suitable thermoplastic material providing a high level of tensile and flexural strength and modulus. The thermoplastic rebound control sleeve is employed in place of plastic bearing members and fluid sealing O-rings of prior energy absorbing units. In this construction a bearing and stabilizer sleeve is securely mounted on an inner cylinder of an energy absorbing unit for engaging the crimped or stop end of an outer cylinder. This sleeve is provided with a radial rib and a groove which cooperates with the rebound control sleeve that elastically deforms when stressed as the cylinders telescope to add a drag load therebetween. After impact, when the cylinders are automatically returned toward their normal position, the drag load exerted between the cylinders by the control sleeve is such that the return speed of the inner cylinder to its normal position is controlled and reduced to minimize or prevent any rebound damage to a vehicle or other structure impacted. The rebound control sleeve is normally housed in a free or undeflected state in the bulged or spud section of the outer cylinder of an energy absorber unit and is only compressed during an impact and return stroke of the unit and therefore is not constantly subjected to stresses which may cause the sleeve to take a permanent set or lose its spring force. Since the rebound control sleeve is, in effect, a spring loaded member, the drag load is not sensitive to tolerance variation between the two cylinders. In addition to providing a drag force the sleeve effectively provides a seal to prevent the escape of fluid from the unit to the exterior thereof. The rebound control sleeve of this invention is a one-piece component which is easily manufactured and assembled on the bearing and stabilizer sleeve.

An object, feature and advantage of this invention is to provide a new and improved rebound control assembly for an energy absorber unit comprising a resilient sleeve member, mounted on a stop member, which is stressed only after a load effects the relative telescoping movement of cylinders of the unit from an extended position to exert a frictional drag load therebetween so that the return speed of the energy absorber unit to the extended position is reduced after initial impact.

Another object, feature and advantage of this invention is to provide a new and improved one-piece rebound control sleeve operatively disposed in a telescoping hydraulic-pneumatic energy absorber unit which adds a mechanical drag load to control and lower the return or rebound speed of the unit to an extended position after impact and which acts as a fluid seal to prevent leakage of fluid from the unit.

Another feature, object and advantage of this invention is to provide a new and improved rebound control assembly for energy absorber units which comprises a thermoplastic sleeve carried by an inner cylinder which is normally disposed in a free, undeflected state in a portion of an outer cylinder, which deflects when subjected to a deforming stress into a groove provided in a stop mechanism and which exerts a radially directed outward force providing a drag load on the outer cylinder for the effective control and reduction of rebound speed of the inner cylinder subsequent to the removal of the impact force telescoping the inner and outer cylinders together.

These and other features, objects and advantages of this invention will become more apparent from the following detailed description and drawings in which.

Figure 2:
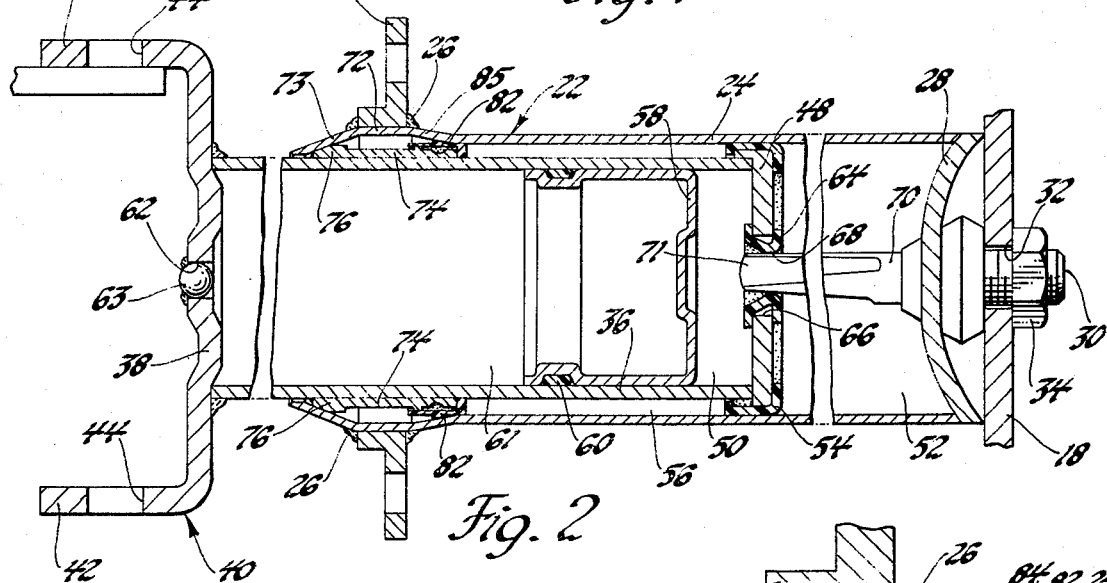
FIG. 2 is an enlarged sectional view taken generally along the plane indicated by lines 2—2 of FIG. 1, showing the energy absorber unit in its normal extended position.
Figure 3:
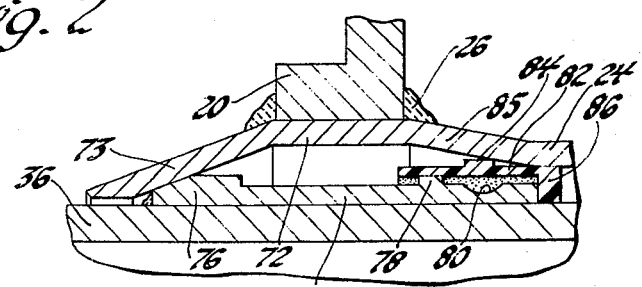
Figure 4:
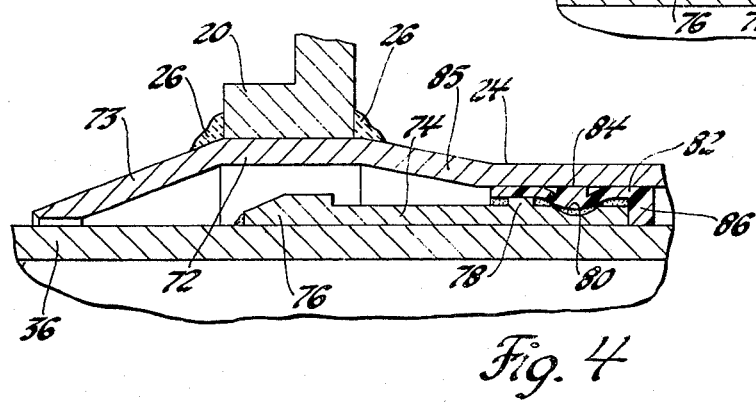

FIG. 3 is an enlarged view of a portion of FIG. 2, illustrating the position of the rebound control sleeve when the units are in their normal extended position; and FIG. 4 is a view similar to the view of FIG. 3 which shows the deflection of the rebound control sleeve when stressed after impact in response to the telescoping movement of the inner cylinder of the energy absorber into the outer cylinder.

Figure 1:
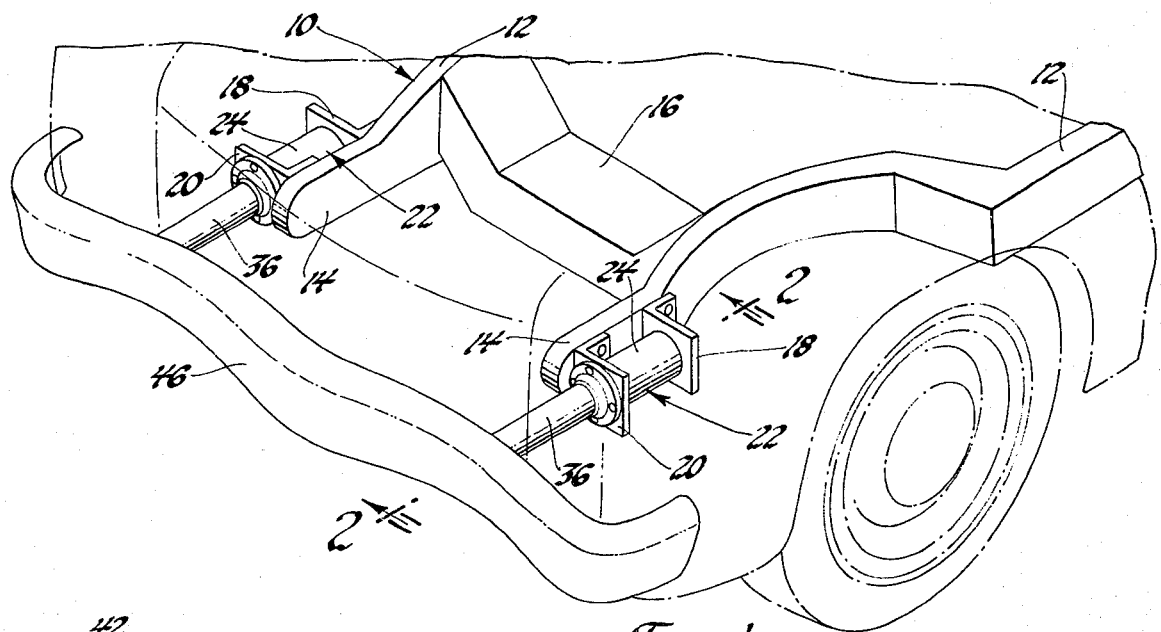
FIG. 1 is a perspective view of an automotive vehicle chassis frame including energy absorber units mounting the bumper assembly to the frame.

Referring now particularly to FIG. 1 of the drawing, there is a chassis frame 10 comprising a laterally spaced pair of side rails 12 having forwardly extending horn portions 14 interconnected by a front cross member 16. Bolted to each horn portion 14 are rear bracket 18 and front bracket assembly 20 which are L-shaped and which connect spaced energy absorbing units 22 to the chassis frame 10. Each energy absorber unit 22 extends through a circular opening in its associated bracket assembly 20 and has an outer cylinder 24 which is secured by welds 26 to this bracket assembly. The outer cylinder 24 is closed by end cap 28 having a central threaded stud 30 fixed thereto that extends outwardly through an opening 32 in bracket 18. Nut 34 threaded onto stud 30 secures the outer cylinder 24 to bracket 18.

In addition to the outer cylinder 24, each energy absorber unit 22 comprises an inner cylinder 36 which is mounted for limited telescoping movement within cylinder 24 and which projects forwardly therefrom. The forward end of the inner cylinder 36 is closed by a base plate 38 of a bumper bracket 40 which has spaced ears 42 with aligned openings 44 for a vertical pivot pin of a bumper adaptor bracket, not shown, which is suitably fastened to a front bumper assembly 46. At the inner or rearward end of each inner cylinder 36 there is a cap 48 which defines rear and intermediate fluid chambers 50 and 52 each filled with a suitable fluid such as oil. A bearing sleeve 54 of a suitable material such as glass filled nylon is mounted over the cylinder cap 48 to slidably fit the inner diameter of cylinder 24. There is, however, sufficient clearance between bearing sleeve 54 and the inner walls of cylinder 24 so that chamber 52 is in direct hydraulic communication with a cylinder inner space 56 formed between the outer and inner cylinders.

Disposed within inner cylinder 36 is a floating sheet metal piston 58 fitted with an O-ring 60 that separates chamber 50 from a front chamber 61 formed between floating piston 58 and the base plate 38. A quantity of gas is compressed in chamber 61 being injected through an orifice 62 formed in the base plate 38 which is subsequently sealed by a ball 63 welded therein. The force of the gas compressed within chamber 61 urges the inner cylinder 36 in a forward direction to the normal extended position shown in FIG. 2.

An orifice element 64 is received within an aperture 66 in the cylinder cap 48. Orifice element 64 has an annular sharp edge 68 and is generally U-shaped in cross section to include radial flanges which embrace the cylinder cap. The orifice element 64 is sized so that it may float or radially slide within the aperture 66.

A metering rod 70 centrally welded to cap 28 extends forwardly in the outer cylinder 24 and is received within the orifice element 64. The rod 70 is formed with three equally spaced flats 71 disposed at various angles with respect to the rod centerline over the length of the latter to exhibit varying depths relative to the cylindrical dimension of the rod. The rod is sized closely to the diameter of the orifice element 64 at edge 68 so that the orifice element is guided by the curved portions of the rod. During an energy absorbing operation with impact forces telescoping cylinder 36 and the cylinder cap 48 inwardly, any slight axial misalignment between the metering rod and aperture 66 is accommodated by the predetermined limited amount of radial floating or sliding movement of orifice element 64 permitted by its radial clearance from the edge of aperture 66.

The flats of metering rod 70 provide for a gradually decreasing orifice area between the rod and the sharp edge 68 of the orifice when the inner cylinder is stroked by impact forces on the bumper assembly so that a constant pressure in contracting chamber 52 is maintained as the fluid in chamber 52 is metered into expanding chamber 50. When this occurs floating piston 58 moves forwardly to further compress the gas in chamber 62.

As shown in FIG. 2, the end of cylinder 24 is bulged at 72 and is provided with an inwardly tapered wall 73 formed after assembly of the cylinders together. An annular bearing and stabilizing sleeve 74 of steel is welded to cylinder 36 and has at its forward extremity a tapering head 76 which snugly engages the tapered wall 73 to prevent radial play between the cylinders in their extended position and to form a stop for the two cylinders in their expanded position. As best shown in FIGS. 2, 3 and 4, the bearing and stabilizing sleeve 74 extends around the cylinder 36 and is formed with a radially outwardly extending ring 78 and with an annular groove 80 adjacent to ring 78 that extends radially inwardly. Disposed over the end of the stabilizing sleeve is a resilient cylindrical sleeve 82 of a thermoplastic such as Teflon, Nylon or of other suitable material which provides added internal friction to the unit for improved rebound control and a fluid seal between the two cylinders. The resilient sleeve 82 has its forward end seated on ring 78 and is thus spaced from the cylindrical body of the stabilizing sleeve. The resilient sleeve 82 has a radially outwardly extending annular rib 84 intermediate the ends thereof, aligned with groove 80 in the stabilizing sleeve, which engages a conical inner wall or inwardly inclined ramp 85 of the bulged portion 72 of the outer cylinder 24. Also the resilient sleeve 82 is formed with an annular end wall 86 disposed at the end of the stabilizing sleeve which engages the inner wall of cylinder 24 and the outer wall of cylinder 36 to effectively seal the annular space 56 to prevent leakage of fluid to the stabilizing sleeve and to the exterior of cylinder 24.

On impact of the bumper assembly 46 the inner cylinder 36 will telescope into the outer cylinder 24 causing the fluid to flow through the orifice from contracting chamber 52 into expanding chamber 50 to stroke the floating piston to further compress the gas in chamber 61. As the inner cylinder strokes rearwardly to absorb impact energy the annular rib 84 of the resilient sleeve 82 rides on the ramp 85 which initially stresses and deflects the intermediate portion of the sleeve 82 into groove 80 of stabilizing sleeve 76. On encountering the smaller diameter wall of the outer cylinder 24 the intermediate portion of sleeve 82 will be fully deflected downwardly into the groove 80. The restoring spring force of the resilient sleeve 82 exerted through rib 84 on the internal wall of the cylinder 24 as the inner cylinder strokes to the retracted position provides internal friction which adds to the energy absorbing characteristics to the energy absorbing unit 22. This frictional drag more importantly provides improved rebound control as the unit automatically restores to its fully extended position when the impact force is relieved and the gas in chamber 61 expands to stroke the inner cylinder forwardly. On the restoring stroke the rib 84, in spring engagement with the inner walls of the cylinder 24, adds internal friction to the unit to thereby produce a drag load to retard and slow down the return stroke of the inner cylinder. This drag load supplements the rebound control provided by the metering of fluid from chamber 50 through the orifice into chamber 52. Also the drag load is not sensitive to tolerance variation between the cylinders since the sleeve 82 is spring loaded. Since the sleeve is normally disposed in the bulge of the outer cylinder the spring sleeve is not deflected until needed and there is thus no loss of spring force or permanent set of the sleeve 82.

While the invention has been described in connection with a preferred specific embodiment thereof, it will be appreciated by those skilled in the art that various modifications in this construction can be made in light of this description and without departing from the spirit of the disclosure or the scope of the following claims:

I claim:

1. An impact energy absorbing unit for mounting a bumper assembly to automotive vehicle structure comprising first and second cylinders, support means mounting said first cylinder for telescoping movement with respect to said second cylinder between an extended position and a retracted position, said second cylinder having an inwardly extending wall portion at one end thereof, stop means fixed to said first cylinder for engaging said wall portion to establish the extended position of said cylinders, means operatively disposed in said cylinders for absorbing the energy of an impact force imparted to said bumper assembly in response to movement of said first cylinder to said retracted position, motor means disposed in said cylinders for relatively moving said first cylinder from said retracted position to said extended position in response to release of the impact force, annular resilient sleeve means mounted on said stop means and disposed between said cylinders, said sleeve means having contact means engageable with the inner wall of said second cylinder for deflecting said sleeve means inwardly in response to the movement of said first cylinder from said extended position and for exerting a radial drag load between said cylinders to control and reduce the return speed of said first cylinder when moving from said retracted position to said extended position, and annular housing means in one of said cylinders for permitting said sleeve means to assume an unstressed state in response to movement of said first cylinder to said extended position.

2. An impact energy absorbing unit for mounting a bumper assembly to automotive vehicle structure comprising first and second cylinders, support means mounting said first cylinder for telescoping movement with respect to said second cylinder between an extended position and a retracted position, means operatively disposed in said cylinders for absorbing the energy of an impact force imparted to said bumper assembly in response to movement of said first cylinder to said retracted position, motor means disposed in said cylinders for relatively moving said first cylinder from said retracted position to said extended position in response to release of the impact force, rebound control means operatively disposed between the walls of said cylinders, said rebound control means comprising an elastic sleeve supported on one of said cylinders and deformed by a stress exerted thereon by the wall of the other of said cylinders subsequent to the movement of said first cylinder from said extended position for exerting a radially directed friction load between said cylinders to control and reduce the return speed of said first cylinder when moving from said retracted position to said extended position, and housing means in one of said cylinders for permitting said elastic sleeve means to restore to an unstressed state in response to movement of said first cylinder to said extended position.

3. An energy absorbing mounting unit for a bumper assembly of an automotive vehicle comprising inner and outer cylinders, support means mounting said inner cylinder for telescoping movement with respect to said outer cylinder between an extended position and a retracted position, primary control means operatively disposed in said cylinders for absorbing the energy of an impact force imparted to said bumper assembly relatively moving said cylinders from said extended toward said retracted position, motor means operatively disposed in said cylinders for relatively moving said cylinders from said retracted position to said extended position in response to the release of the impact force from said bumper assembly, stop means secured to said inner cylinder for engaging an end portion of said outer cylinder to establish said extended position of said cylinders, annular elastic sleeve means carried by said stop means and operatively disposed between said inner and outer cylinders, said sleeve means having annular contact means extending radially outwardly therefrom, said outer cylinder having an inner wall which engages said contact means and exerts a deforming stress deflecting said sleeve means radially inwardly in response to movement of said inner cylinder from said extended position so that the force of restitution of said sleeve means will exert a frictional drag load between said cylinders to reduce the return speed of said inner cylinder when moving from said retracted position to said extended position.

4. A hydraulic-pneumatic energy absorbing mounting unit for a bumper assembly of an automotive vehicle comprising inner and outer cylinders having separate contractable and expansible chambers with oil therein, support means mounting said inner cylinder for telescoping movement with respect to said outer cylinder between an extended position and a retracted position, control means operatively disposed in said cylinders for controlling the flow of oil between said chambers to absorb the energy of an impact force imparted to said bumper assembly relatively moving said cylinders from said extended position to said retracted position, motor means operatively disposed in said cylinders for relatively moving said cylinders from said retracted position to said extended position in response to the release of the impact force from said bumper assembly, stop sleeve means secured to said inner cylinder for contacting the end of said outer cylinder for establishing the limit of telescoping of said cylinders in said extended position, said stop sleeve means having an outwardly extending support and an annular groove therein, elastic rebound control and fluid sealing sleeve means carried by said inner cylinder disposed on said stop means and between said inner and outer cylinders to provide a movable fluid seal between said cylinders, said elastic sleeve means being seated on said support and extending over said groove having outwardly extending rib means, said outer cylinder having an inclined ramp and an adjoining inner wall which engages said rib means for exerting a deforming stress to said sleeve means to deflect a portion of said sleeve into said groove in response to movement of said inner cylinder from said extended position so that said sleeve means will exert a yielding frictional drag load between said cylinders when deformed to reduce the return speed of said inner cylinder from said retracted position to said extended position.

* * * * *